United States Patent [19]

Moeser

[11] 4,228,788
[45] Oct. 21, 1980

[54] SELF-CONTAINED ALL-TERRAIN LIVING APPARATUS

[76] Inventor: John Moeser, 14460 Promanade, Detroit, Mich. 48213

[21] Appl. No.: 1,689

[22] Filed: Jan. 8, 1979

[51] Int. Cl.$^3$ ............................ F24V 3/02; B63B 39/03
[52] U.S. Cl. ..................................... 126/437; 126/132; 52/66; 109/1 S; 62/238; 114/125; 114/256; 114/219; 165/DIG. 2; 165/104 S
[58] Field of Search ............... 126/436, 438, 437, 121, 126/132, 400; 110/234; 62/238 E; 52/65, 66, 2; 109/1 S; 114/125, 256, 65 R, 65 A, 219; 405/195, 212; 71/10; 210/16; 60/641; 290/55; D 25/19; 165/DIG. 2, 104 S

[56] References Cited

U.S. PATENT DOCUMENTS

| | | | |
|---|---|---|---|
| 1,088,239 | 2/1914 | Paine | 52/80 |
| 2,166,577 | 7/1939 | Beckius | 52/169.1 |
| 3,212,105 | 10/1965 | Baker et al. | 109/1 S |
| 3,581,692 | 6/1971 | Mortellito | 114/65 R |
| 3,593,531 | 7/1971 | Saadeh | 405/212 |
| 3,922,876 | 12/1975 | Wetherington, Jr.et al. | 62/238 E |
| 3,996,862 | 12/1976 | Besik et al. | 110/234 |
| 4,015,381 | 4/1977 | Schmidt | 52/199 |
| 4,049,194 | 9/1977 | Tree et al. | 126/427 |
| 4,050,626 | 9/1977 | Awalt, Jr. | 126/121 |
| 4,057,401 | 11/1977 | Boblitz | 71/10 |
| 4,061,926 | 12/1977 | Peed | 290/55 |
| 4,077,392 | 3/1978 | Garner | 126/438 |
| 4,100,023 | 7/1978 | McDonald | 71/10 |

FOREIGN PATENT DOCUMENTS 2272726 1/1976 France ............................ 71/10

OTHER PUBLICATIONS

"Sandwich Yacht Construction," *The Naval Architect* (London), Oct. 1971, p. 61.

*Primary Examiner*—Carroll B. Dority, Jr.
*Assistant Examiner*—Lee E. Barrett
*Attorney, Agent, or Firm*—Cullen, Sloman, Cantor, Grauer, Scott & Rutherford

[57] ABSTRACT

A living apparatus comprises a first reservoir within the ground surface of circular form and having a quantity of water therein. A building having a roof and a peripheral side wall of circular form is concentrically nested and spaced within said reservoir. A convex hull is peripherally connected and sealed to the bottom of said building wall and immersed within the water and floatingly projected into said reservoir, a substantial portion of said building wall extending above said ground surface. A second reservoir within the ground surface is spaced from and below said first reservoir. A drain outlet is spaced above the bottom of said first reservoir; and a conduit interconnects said outlet and said second reservoir. A valve on said outlet is adapted to variably control the drain of water from said first reservoir to said second reservoir with the building adapted to controllably descend within said first reservoir throughout any desired distance up to the building roof yet, buoyantly immersed within the remaining water in said first reservoir for protectively enclosing the building within said first reservoir against storms, tornados, earthquakes, extreme temperatures or other conditions endangering the intergrity of the building. A power-operated pump is connected to a conduit between said reservoirs for returning water from said second reservoir to said first said reservoir and controllably regulating elevation of the building within said first reservoir. Within a central vertical axis of the building, there is provided an energy core upon the hull. An apertured support column is coaxially mounted upon said core and at its upper end, supports the roof.

25 Claims, 16 Drawing Figures

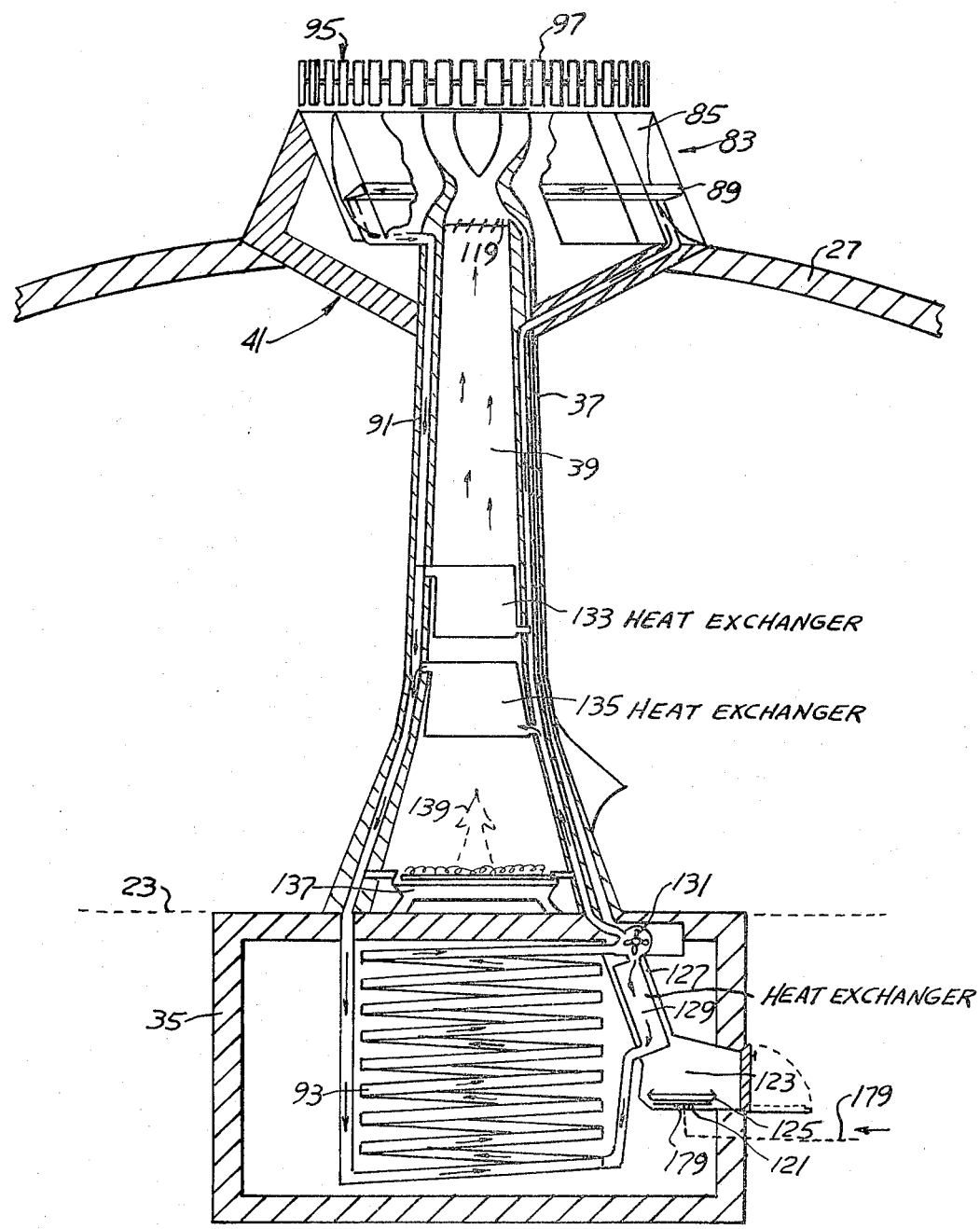

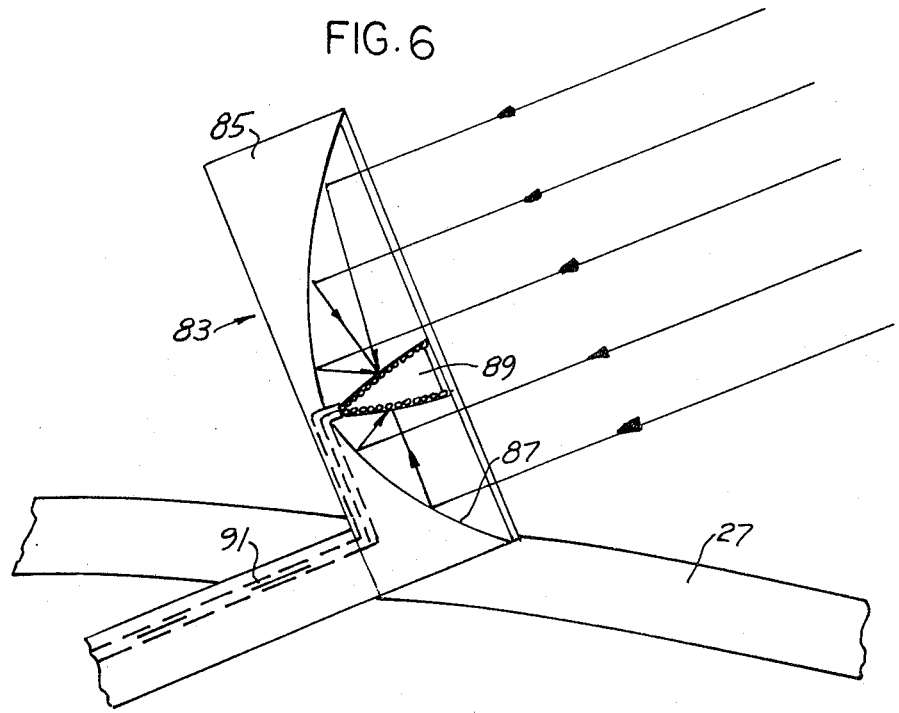
FIG. 6
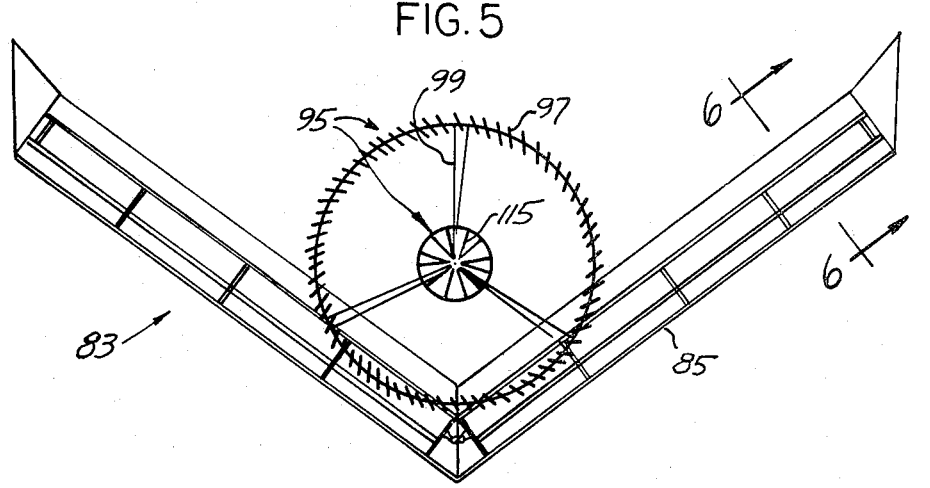
FIG. 5
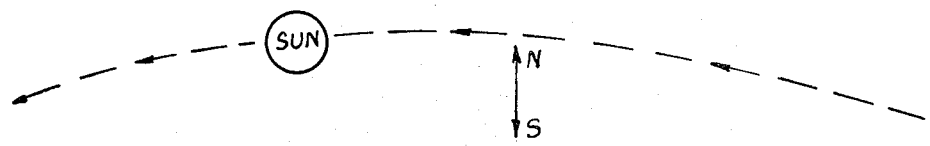

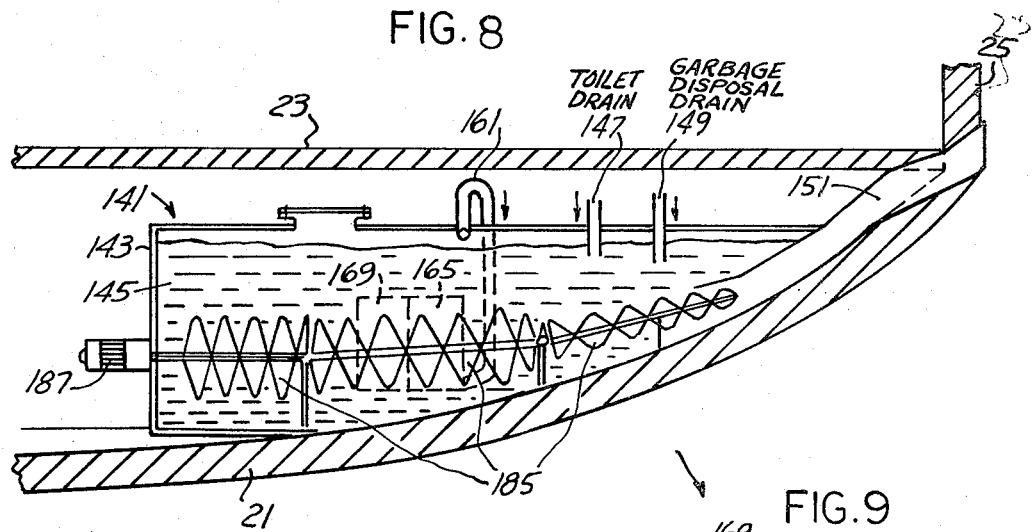
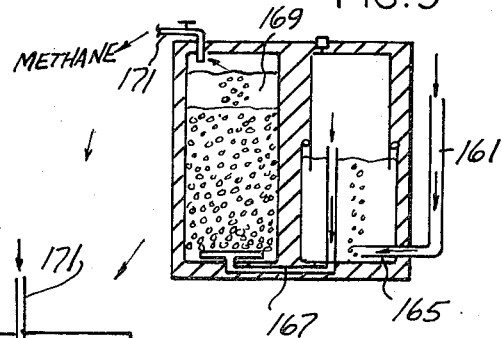
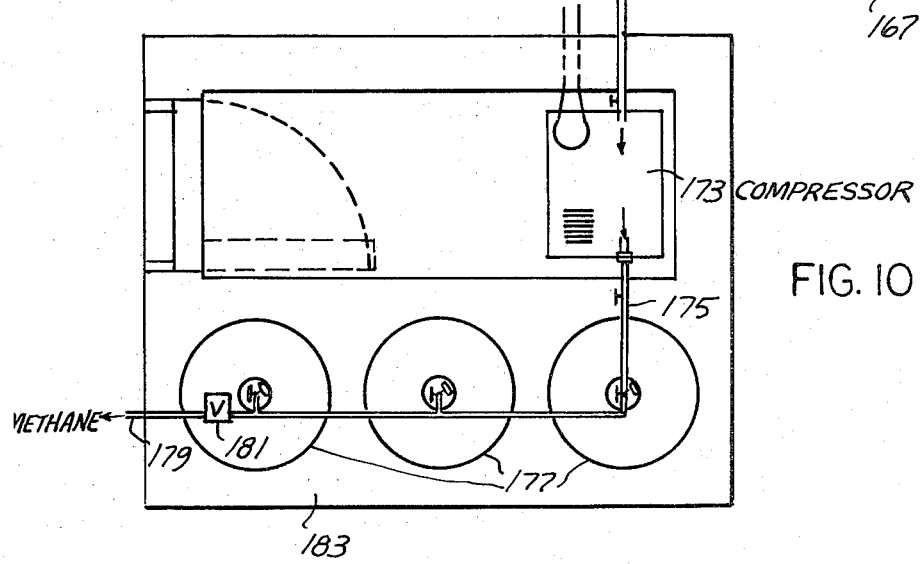

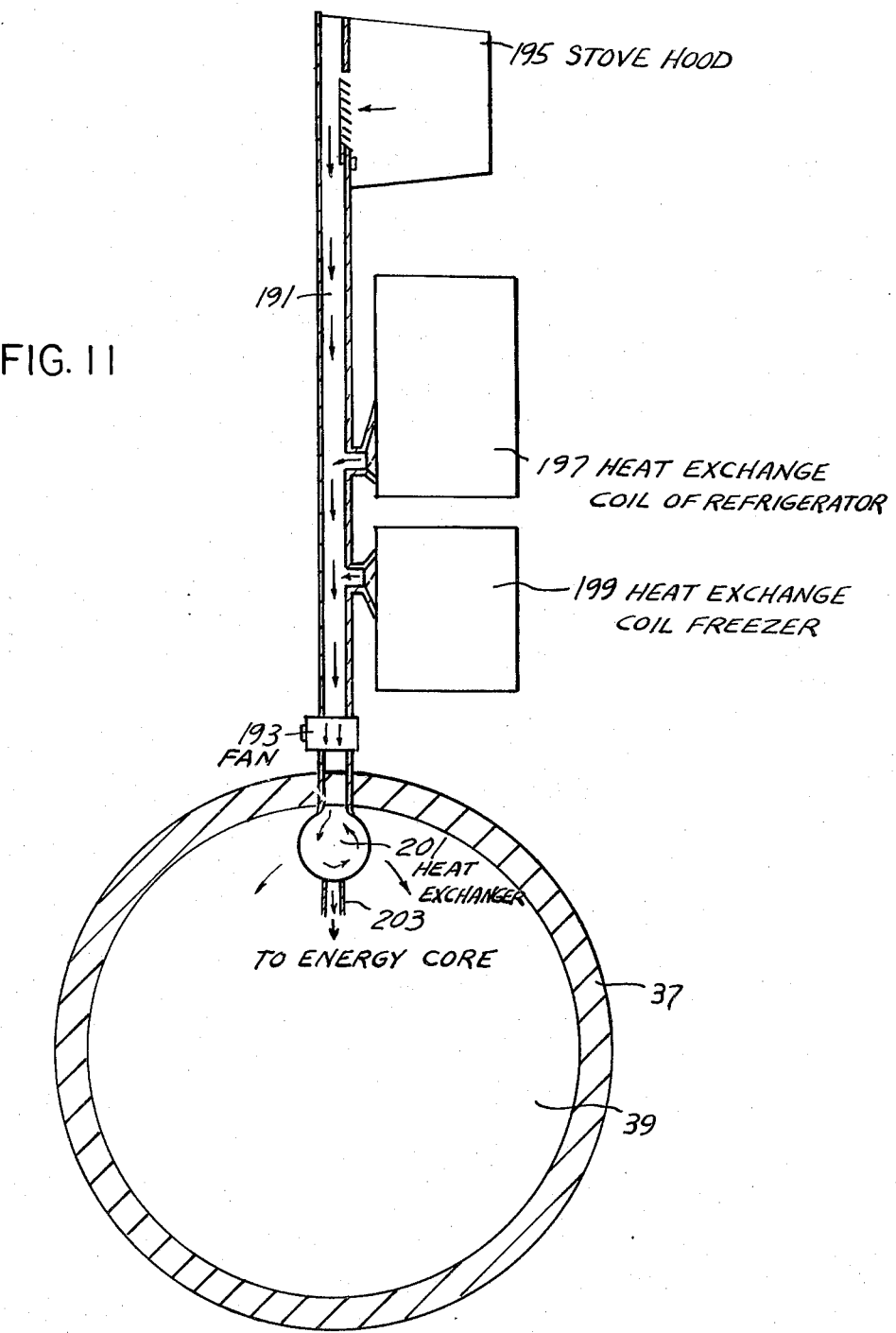

SELF-CONTAINED ALL-TERRAIN LIVING APPARATUS

BACKGROUND OF THE INVENTION

A round house design is not new and examples of such are shown in U.S. Pat. Nos.:
1,088,239
2,166,577
4,015,381.

While apparently, it is known to provide buildings within a water foundation, as in U.S. Pat. No. 1,088,239, apparently, it is not known to provide a mechanism by which a building construction, such as a house or the like, may be buoyantly floated within a reservoir and wherein, by regulating the level of water in said reservoir, the buoyant building may be raised or lowered with respect to the surrounding ground terrain.

SUMMARY OF THE INVENTION

It is an object of the present invention to provide a round house construction or building having a sealed convex hull and having a suitable roof with the hull floatingly immersed within the water of a first reservoir and with the level of the water within the reservoir determining that portion of the building which projects above the ground terrain and which portion, if any, is protectively enclosed within the reservoir.

It is another object to a provide a means by which the water within the reservoir can, to a great extent, be drained and wherein, the building will be floatingly dropped down into the reservoir so as to be protectively enclosed thereby for protection against violent storms, tornados, earthquakes, temperature extremes, or other conditions which would endanger the integrity of the building.

It is another object to provide a secondary reservoir spaced from and below the first reservoir together with a conduit means and valve control by which the water within the first reservoir may be controllably drained into the second reservoir thus, regulating the projecting height of the building within the first reservoir and including downward movement of said building until its roof is substantially in registry with the ground surface.

It is a further object to provide a pumping mechanism by which the water from the second reservoir may be controllably returned to the first reservoir to again, elevate the building floating therein to the extent desired so as to project above the ground surface.

It is a further object to provide an improved and insulated roof construction, an insulated building hull as well as the side walls thereof for the efficient maintenance of heat therein in cold weather and the exclusion of outside heat therefrom in hot weather.

It is a further object to provide an improved roof construction of convex shape in conjunction with the building of circular form in plan as a protective cover for the building and particularly useful in protecting the building when it has been materially dropped floatingly into the first reservoir for protective enclosure therein with the roof in substantial registry with the ground surface.

It is a further object to provide for such a house a self-contained substantially complete energy system which includes an energy core for the storage of heat energy within the hull of the building upon its central axis and includes thereabove an apertured column which, at its upper end, supportably engages a roof assembly.

It is a further object to provide upon such roof a solar heating system of such construction as to deliver from its collectors heat which is transmitted to the energy core for storage and use as needed. It is another object to provide a windmill upon the roof to operate an electric generator providing supplemental power for operating equipment within the building including air conditioners or water heaters.

A further object incorporates the provision of an incinerator within the building hull adjacent the energy core and adapted to use solid, liquid or gaseous fuel and including a burner for delivering heat to a combustion chamber which includes a heat exchanger for picking up combustion heat and transmitting it to the energy core.

It is a further object to provide a methane generator within the building hull adapted to utilize organic waste from the inside and outside of the building for the production of methane incorporated into a system for delivering and storing the methane within tanks and adapted for communication with the burner within the incinerator.

A further object includes the use of a stand by liquid fuel storage such as oil or the like, which can also be communicated with the burner in the incinerator for alternate use in emergency situations, or otherwise when sufficient energy is not available to maintain needed heat for the building construction.

It is a further object to provide an additional source of heat energy by the provision of a fireplace, having a combustion chamber normally disposed within a portion of the columns above the energy core and which includes one or more heat exchangers for delivering combustion heat from the burning of wood and other articles that are combustible and delivering such heat back to the energy core.

It is a further object to scavenge heat from the stove exhausts and from other equipment, such as a refrigerator or a freezer wherein, the heat transfer coils deliver heat transmitted through suitable heat exchangers and conduits back to the energy core.

It is a further object to provide in a single building construction referred to as self-contained all-terrain living apparatus, the combination of each of these independent energy sources which may be all employed for providing heat energy to the energy core and for providing electrical power as needed.

These and other objects will be seen from the following specification and Claims in conjunction with the appended drawings.

THE DRAWINGS

FIG. 3 is a schematic view showing the energy core for the building and the axially disposed roof supporting column thereon.

FIG. 5 is a fragmentary plan view of the solar heater.

FIG. 6 is a fragmentary section on an enlarged scale taken in the direction of arrows 6—6 of FIG. 5.

FIG. 8 is a schematic side view of the methane generator within the hull of the building shown in FIG. 1.

FIG. 9 is an elevational section of the collector and filter construction for the methane generator shown in FIG. 8.

FIG. 10 is a fragmentary plan view of the methane compressor and methane storage tanks.

FIG. 11 is a schematic plan view illustrating the utilization of waste heat from the building stove, refrigerator and freezer.

It will be understood that the above drawings illustrate merely a preferred embodiment of the invention, and that other embodiments are contemplated within the scope of the claims hereafter set forth.

DETAILED DESCRIPTION OF THE INVENTION

Figure 1:
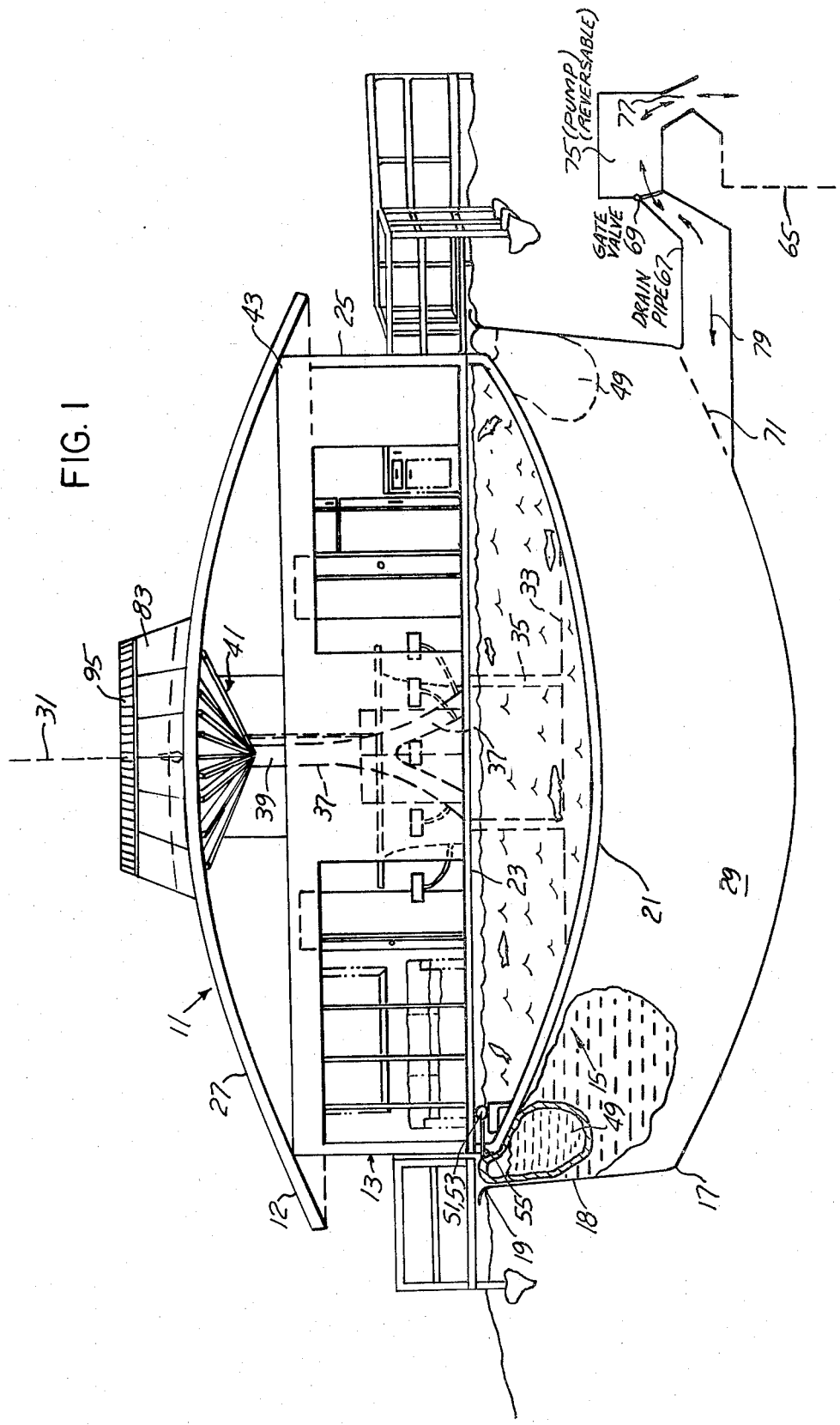
FIG. 1 is a side elevational view of the present living apparatus buoyantly floated within a reservoir within the ground surface with the reservoir being fragmentarily shown.
Figure 2:
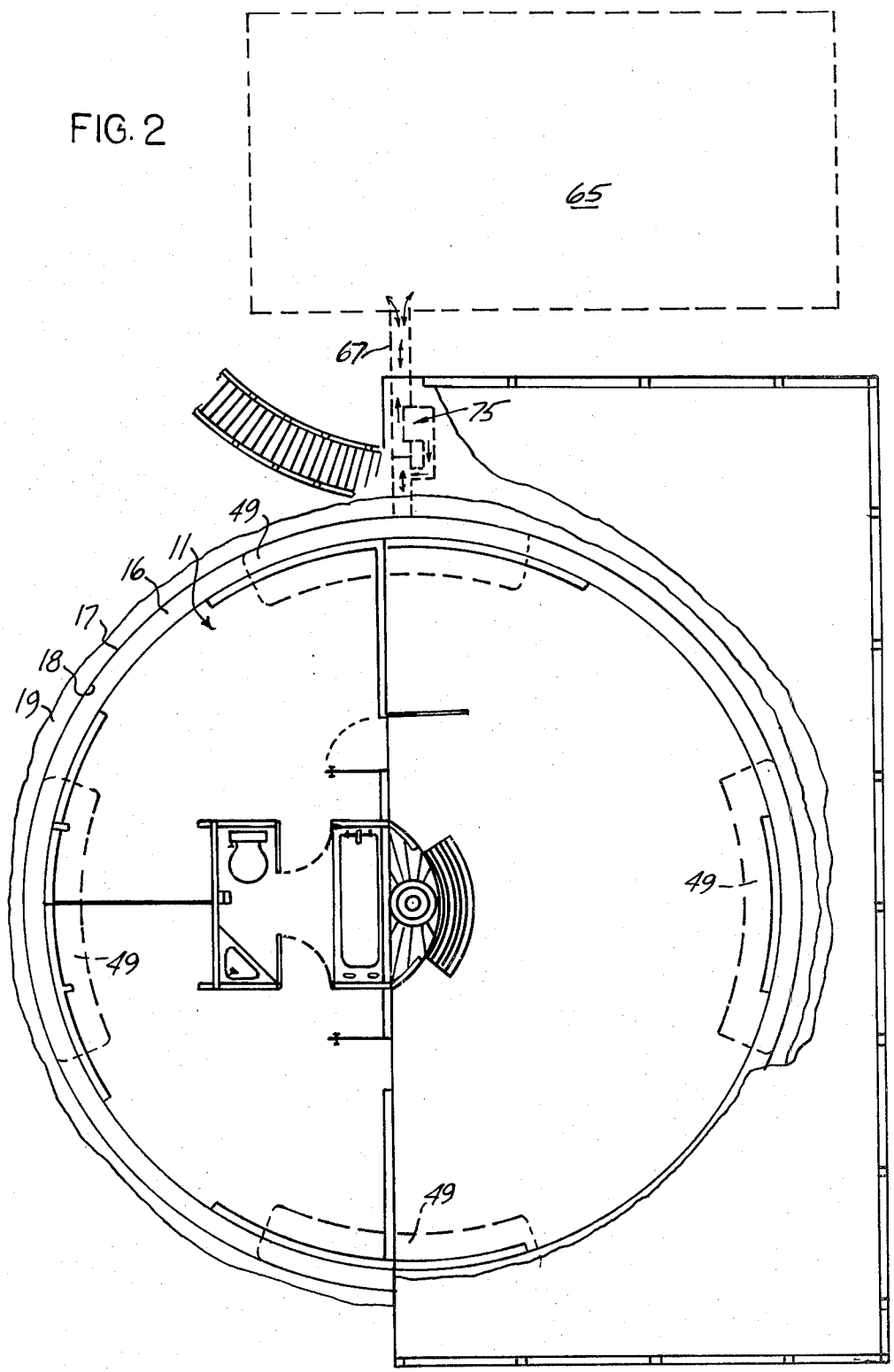
FIG. 2 is a plan view thereof.

Referring to the drawings, the present self-contained all-terrain living apparatus is generally indicated at 11 in FIGS. 1 and 2 and includes the circular building 13 having a floating foundation generally indicated at 15.

A first reservoir 17 is formed or cut into the ground surface, FIG. 1, and includes the side walls 18 of circular form and of a predetermined diameter terminating at its top edge in the outturned curb 19.

The building includes a convex hull 21, preferably of parabolic form, the transverse main floor 23, and the peripheral circular side wall 25. Said side wall is constructed of a diameter less than the diameter of the reservoir so that the building is nested down into the upper portion of the reservoir and buoyantly floated within the body of water 29 therein. A series of windows 26 are assembled in wall 25.

The building includes a dome-shaped roof 27, preferably of parabolic form, all arranged with respect to a central vertical axis 31. A portion of the hull upon its interior has a basement floor 33 upon which is mounted an energy core 35 which incorporates means for storage of heat energy and is arranged coaxial of the building axis.

An upright fluted column 37 having an axial bore 39, as shown in FIG. 3, is mounted upon the energy core 35 and is adapted to support the roof 27.

The roof construction includes a series of upright angularlyrelated truss sections 41, each having an arcuate or convex top surface to supportably engage the roof. The inner ends of each truss section is supported and mounted upon the column 37 with said sections projected radially outward and cantilevered and supported upon the corresponding side walls 25 and bolted thereto, as at 43.

The roof 27 includes, in the illustrative embodiment, a metal reinforced polyurethane foam plastic material 45 which may be approximately 8 to 10 inches in thickness and has upon its interior and exterior a covering aluminum skin 47. Another roof insulation may be used. See FIG. 4b.

This provides a well-insulated roof construction for the conservation of heat energy in cold weather and the exclusion of heat in the warm weather.

Though not shown in FIGS. 1 and 2 in detail, the corresponding circular walls 25 are also of an insulated construction for the same purpose as is also the convex hull 21. A series of right-angularly related inflatable cushion spacer bags 49, FIGS. 1 and 2, are interposed between portions of the reservoir adjacent the curb 19 and guidably and spacingly engage portions of the building circular wall 25. Said spacers are secured to the reservoir walls.

The spacers are preferably of a rubber or other flexible construction, such as plastic, are elongated and arcuate as shown at 49 in FIG. 2. Said spacers are adapted to cooperatively and guidingly receive portions of the adjacent hull and circular side walls for centering and spacing the circular building 13 within said reservoir and to guidingly engage the same if some of the water 29 is drained therefrom with the building buoyantly mounted within the water descending down into said reservoir towards the bottom thereof.

Figure 4A:
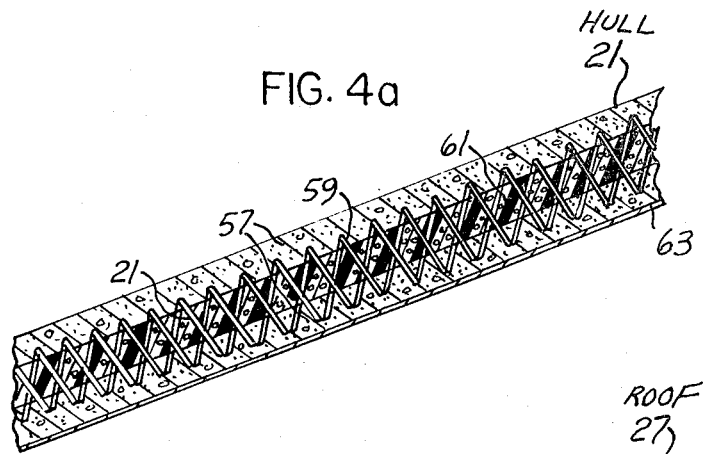
FIG. 4a is a fragmentary section on an enlarged scale of a portion of the building hull shown in FIG. 1.
Figure 4B:
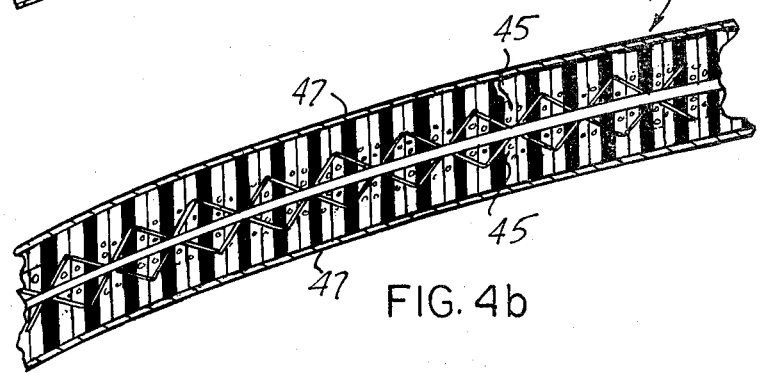
FIG. 4b is a fragmentary section of the roof.
Figure 4C:
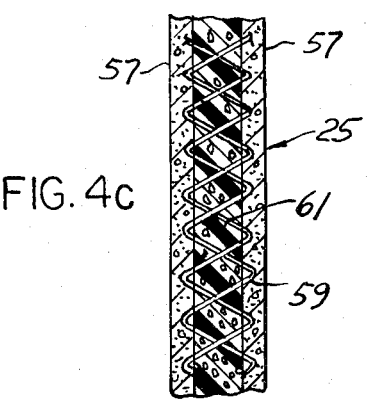
FIG. 4c is a fragmentary section of a portion of the building wall.
Figure 4D:
FIG. 4d is a vertical section of a building window.

As shown in the section, FIG. 4a, of a portion of the hull 21, there are provided a pair of spaced layers of concrete 57 incorporating a steel rein⌒rcement 59, and between said layers of reinforced concrete, a layer of polyurethane foam 61, or other insulator.

An exterior layer of Lexan or Fiberglass, as at 63, is applied to the undersurface of the hull to the lowermost of the reinforced concrete layers to further seal off said hull.

Peripheral circular portions of the hull are sealingly joined to lower portions of the circular wall 25 to provide a buoyant building construction which is sealed and imperforate and which has insulating characteristics to avoid heat loss from the building into the water within said reservoir.

Schematically shown in FIG. 1, and spaced from the first reservoir 17 within the ground surface and below the first reservoir is a second water storage reservoir 65.

A drain outlet 71 is formed in said hull and spaced above the bottom thereof and includes a manually or power-controllable gate valve 69 in communication with a conduit for drain pipe 67 which interconnects said drain and the second reservoir.

Accordingly, should there be some warning of the approach of a hazard to the building or the building integrity such as an anticipated cyclone or storm, or temperature extremes, or a tornado or the like, manual or other operation of the valve 69 permits a fast drainage or a large portion of the water 29 within reservoir 17 into the second reservoir.

Since the building 13 is buoyant with its hull floating within the water 29, lowering the level of the water 29 will cause a corresponding and controlled lowering of the building down into reservoir 17. In extreme conditions, and under the control of the valve 69, sufficient water may be drained from reservoir 17 such that outer peripheral extension portions of the roof 27 will be substantially adjacent to ground surface to completely and protectively enclose the substantial portion of the building, except for the dome roof down into said reservoir.

The speed at which the building will descend into the reservoir will be determined by the size of the drain pipe 67 and the gate valve controlling such drainage into the second reservoir 65.

In order to provide for selective raising of the building again within reservoir 17, there is provided a power-operated pump or pumps 75, which may be connected into the drain pipe 67 or which, as alternately shown in FIG. 1, has an intake pipe 77 connected to reservoir 65, and an output 79 directed to the interior of reservoir 17 by which the reservoir can be refilled with the water stored within the second reservoir.

Thus, the building may be floatingly elevated to the position shown in FIG. 1 or to any desired intermediate position under the control of the user by regulating the amount of return liquid into reservoir 17.

Pump 75 may be a reversible pump in the event that it is desired to assist in the drainage of the water from the first reservoir into the second reservoir.

The present hermetically sealed convex hull 21 forms a very basic and effective protection of the building against earth shock by actually floating the entire structure in elevated position in the concave water-filled reservoir 17, FIG. 1.

The building is centered and spaced with respect to the circular walls of said reservoir by the series of arcuate elongated spacers 49, FIG. 2. Thus, the structure is capable of withstanding quakes, particularly in areas having high earthquake risk. Said spacers are pressurized by air pump 51-53 and conduit 55 at approximately 5 psi. Fresh water is also stored within said spacers and may be drained off for use in the home.

The floating foundation also provides a yielding support for the building to withstand floods or earth faults or tremors or internal building stresses due to earth settling, heretofore known to be one of the major long term causes of structural failure of buildings.

The present construction of the reservoir 17 expands the potential for building sites for those homes far beyond the limits of conventional building sites and can open up other areas for land and building development.

The floating foundation can also be employed as shown in FIG. 1 for bio-production for human consumption, as for example, the planting and growing of fish within the water in reservoir 17.

In an extreme condition with a substantial portion of the water 29 drained from reservoir 17, the roof is cushioned at approximately ground level. This provides an excellent profile for aerodynamic resistance to horizontal forces including cyclones, huricanes or atom bomb blasts, fires and other factors which may threaten the integrity of the building construction.

The circular form of the building with the convex roof and hull again provide the maximum of internal useable volume for the building and the minimum exposed surface areas.

Accordingly, the space including the water 29 being never completely drained, provides for the production of fish for consumption or sale, merely for illustration of one usage to which the water 29 can be put other than floatingly mounting the buoyant building construction.

Centrally disposed upon roof 27 with respect to the vertical axis 31 of the building is a solar heater 83 shown in detail in FIGS. 5 and 6 as including a pair of angularly related heat sections 85. These sections include a series of parabolic shaped reflectors 87, FIG. 6, for receiving the direct rays of the sun during the day for reflection onto the centrally disposed heat collectors 89. These collectors are adapted to circulate hot water, hot air or any heat transfer substance though the pipes 91 for direction to the energy core 35 and into the heat exchanger heat storage coil 93 therein.

Various additional means may be employed for the storage and reception of heat brought into the energy core 35 and into the coil-type heat exchanger 93 shown in detail in FIG. 3.

Many forms of solar heating mechanisms are known and which could be incorporated for use in the present construction.

Figure 7:
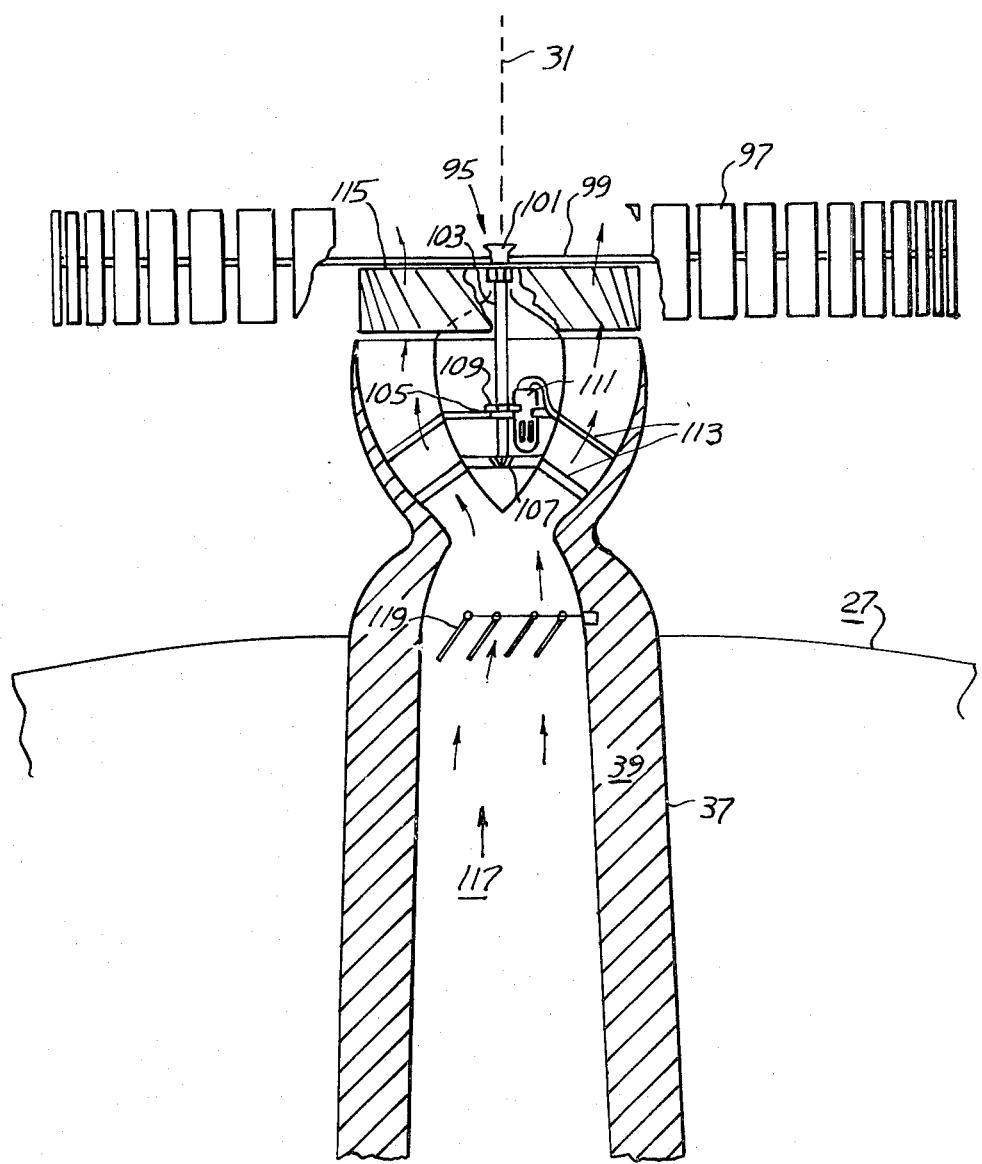
FIG. 7 is a fragmentary schematic side view of the combination windmill and electric generator shown in FIG. 1.

The windmill 95 is mounted over and centrally disposed with respect to the solar heater 83 as shown in FIGS. 1 and 5 and includes a series of peripheral preformed blades 97 upon a circular support 99, on an enlarged scale in FIG. 7.

The windmill is coaxial of the building's central axis 31 and includes a central support hub 101 with depending driven shaft 103 journalled within bearings 105 and supporting on thrust bearing 107. Suitable gearing 109 interconnects the shaft with the electric generator 111 supported upon the framework 113. Said windmill includes a series of centrally disposed auxillary blades 115 which are adapted to respond to upward movement of flue gases 117, passing through the radiating flues 119 at the upper end of the hollow column 37, also shown in FIG. 3.

Thus, the exhaust gases from combustion units at the base of the column pass up through the bore 39 thereof and before escaping to atmosphere, are adapted to have some assisting action upon the blades 115 of the windmill.

Referring to FIG. 3, within the energy core 35, there is arranged a fume-recirculative incinerator 121 with a combustion chamber 123 and a burner 125 adapted to utilize gas or liquid fuels, or compacted combustible garbage. The incinerator combustion chamber communicates with exhaust pipe 127 which, in turn, communicates with suitable passages within the column 37 for delivering products of combustion upwardly therethrough, as shown by the arrows. Any type of incinerator may be employed.

Within the exhaust pipe 127 is an efficient heat exchanger 129 in the form of a series of coils for the delivery of heated water, air or other heat transfer substance to the internal heat exchanger coils 93 within the energy core 35.

A fan or pump 131 represents a device for circulating heat transfer substances within the energy core complex.

Said upwardly-moving gases to the extent that heat remains therein, pass the spaced heat exchanger radiator pipes within said column, FIG. 3, and which are, connected by suitable conduits back into the coiled heat exchanger 93 within the energy core.

A fume-recirculatory fireplace is generally designated at 137 adjacent the lower end of the column 37 and the ground floor 23 of the building and is also capable of burning wastepaper and other consumable articles from usage of the building as a living quarters and adapted also to burn wood, should there be an abundant source of same available for auxilliary heating. This may be referred to as indirect solar heating in the sense that trees grown in the environment provide an additional source of fuel energy. The heated exhaust gases from fires in the combustion chamber 139 are to a great extent absorbed by the radiators 133 and 135, which circulate hot water, or other heat transfer substance back to the energy coil 93.

A cyclic waste system 141 is shown in FIG. 8, as including a methane generator tank 143 located within and upon the hull 21 of the building which is suitably covered and sealed and which contains an organic slurry 145.

The building is so constructed that there is provided a first drain outlet 147, such as a drain for all of the toilets in the building for delivery into and forming a part of the slurry within said tank.

Schematically shown is an additional garbage disposal drain 149 connected to the garbage disposal such as within the sink of the building for delivery of the exhaust therefrom into and to form a part of said slurry.

An additional conduit or feed chute 151 is schematically shown which communicates between the interior of the tank and the slurry therein and the outside of the building through which grass clippings, weeds, trimmings and manure may be delivered down into the slurry tank, all for the production of methane in a well known manner. This conduit is connected well below the liquid line so that plant material can be exchanged for spent slurry without contaminating the methane with air.

A screw-type of agitator 185 is shown in FIG. 8 driven by a suitable electric motor 187 for turning up the slurry from time to time as desired in the useful production of methane gas within said tank and above the level of the slurry therein.

A collecting conduit 161, FIGS. 8 and 9, having an intake within said tank above the level of the slurry is adapted for delivering methane gas to the upright collector 165.

An additional conduit 167 from the collector tank delivers methane into and through the filter 169. The outlet conduit 171 delivers the filtered methane to a compressor shown schematically at 173, FIG. 10, which outlets at 175 to a series of upright methane storage tanks 177 within a protective enclosure 183.

Said enclosure is normally mounted upon the hull and spaced from the energy core 35. A suitable metering valve 181 and a conduit 179 is adapted to deliver methane gas from the storage tanks to gas operated appliances and to the burner 125 within the incinerator 121 within energy core 35, FIG. 3. Enclosure 183 is fireproof and explosion proof in order to protect the interior of the building.

To render the building more complete in the recovery of energy otherwise wasted, there is schematically shown in FIG. 11, an additional energy pick up system which includes a conduit 191, schematically shown, and with a fan 193 therein in communication with the hood or other exhaust 195 from a stove in the building, in communication with the heat exchanger coil of the refrigerator 197 and the heat exchanger coil or freezer 199.

Said fan will deliver heated gases past the heat exchanger 201 before exhausting. Suitable conduits 203 deliver heated water or other heat exchange substances therefrom down through the column 37 and into the energy core and the tubular coils 93 therein.

ENERGY STAND-BY SOURCE

Figure 12:
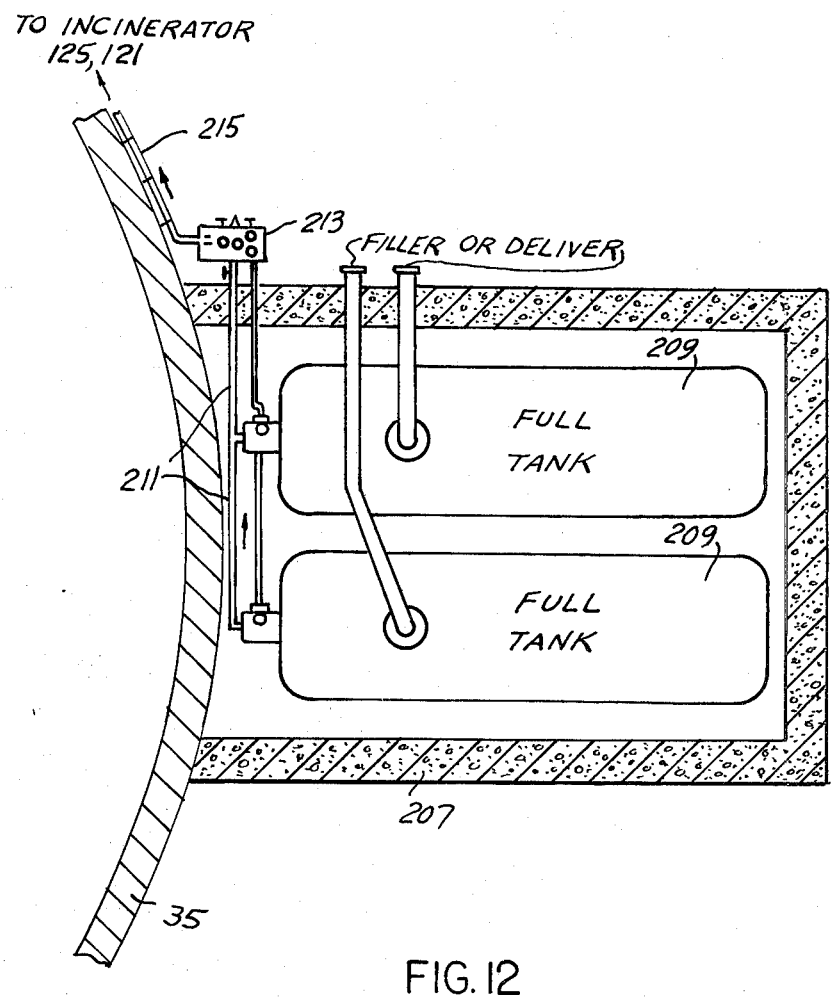
FIG. 12 is a fragmentary plan view of a liquid fuel storage within the hull of the building shown in FIG. 1.

To complete the complete energy system within the building as an integrated unit and self-contained, there is additionally provided a stand-by energy source, generally shown in FIG. 12. This energy source includes a fireproof and explosion proof storage compartment or shield 207 mounted upon the building hull and spaced from the energy core. Said compartment stores one or a plurality of liquid fuel tanks 209, though gaseous fuel could be stored, and which includes an outlet conduit 211 for delivering such fuel through a metering valve 213 and through a suitable fluid conduit 215 for communication with the required form of burner 125 in incinerator 121, FIG. 3.

Thus, in an extreme emergency situation where the self-contained other energy sources are insufficient to provide the heat energy required, the fuel from the tanks 209 could be drawn upon selectively as desired for providing additional heat energy.

Figure 13:
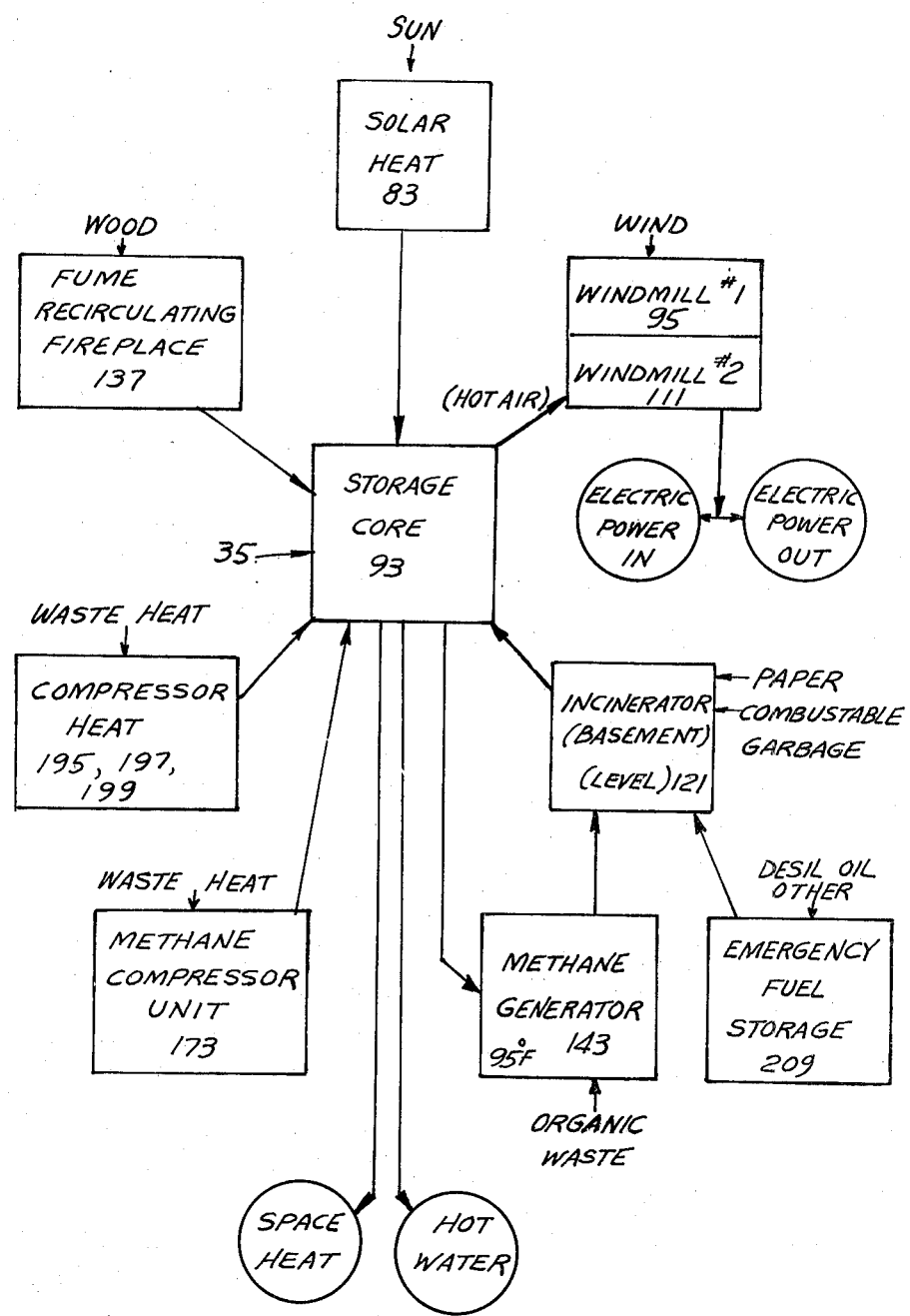
FIG. 13 is a schematic view showing the composite energy and power sources within the living apparatus shown in FIG. 1.

FIG. 13 is a block diagram illustrating the above described independent sources of heat or electrical energy utilized by the building or stored within the energy core 35.

It is recognized that the respective sources of energy and heat each operate independently of each other but compliment one another to the extent that they provide a total utilization of heat, productive in and within the present self-contained, all-terrain living apparatus above described.

Most, if not all of the mechanisms, independently which provide additional heat sources, may lack novelty in themselves as to their construction and operation, but together, combine to provide a complete utilization of all of the various sources of possible energy, all for use within the present living apparatus and for storage to the extent possible within the energy core 35.

It is the cooperation of each of the individual sources of energy, including the source of electrical power for rendering the present living apparatus highly efficient in operation, for the production of the energy requirements for the building in an efficient manner, not only for heating but for the use of electrical power for cooling in hot weather.

While the above-described improvements and the energy core and the multiple sources of heat and electrical energy have been shown and described with respect to a floating hull assembly such as shown in FIGS. 1 and 2, it is nevertheless contemplated that the building construction could utilize an energy core and all these sources of energy and be completely independent of the abovedescribed buoyant building construction.

It would appear that these multiple energy sources would be highly efficient also in a building construction other than the buoyant construction above described.

Having described my invention, reference should now be had to the following claims.

I claim:

1. A self-contained all terrain living apparatus comprising a first reservoir within the ground surface having side walls of circular form, of a predetermined diameter and having a quantity of water therein;

a building having a roof and a peripheral side wall of circular form of less diameter than said reservoir wall, concentrically nested and spaced within said reservoir;

a convex hull peripherally nested and sealed to the bottom of said building wall, and immersed within the water and floatingly projected into said reservoir; with a substantial portion of said building wall extending above said ground surface;

flexible and yieldable spacer means upon and within the upper portion of said first reservoir spacing and enaging and yieldably adapted to guide the building side walls;

a second reservoir within said ground surface spaced from and below said first reservoir;

a drain outlet spaced above the bottom of said first reservoir;

a valve on and controlling said outlet;

and a conduit interconnecting said outlet and said second reservoir, whereby controlled opening of said valve drains controlled quantities of water from said first to second reservoir, said building controllably descending within said first reservoir throughout any desired distance up to said roof yet buoyantly immersed within the remaining water in said first reservoir, for protectively enclosing the building within said first reservoir against storms, tornados, earthquakes, extreme temperature, or other conditions endangering the integrity of said building.

2. In the living apparatus of claim 1, said spacer means including a plurality of spaced right-angularly related elongated arcuate cushions.

3. In the living apparatus of claim 2, said cushions being hollow and partly containing water, adapted for use within the building;

a power-operated compressor on said hull; and a conduit extending between and interconnecting said compressor and said cushions for applying variable air pressure thereto.

4. In the living apparatus of claim 1, said hull including a pair of spaced steel reinfoced concrete layers;

a layer of polyurethane foam plastic snugly interposed between said concrete layers; and an exterior sealing layer of fiberglass or Lexan upon the outer of said concrete layers.

5. In the living apparatus of claim 1, a power-operated pump connected to said conduit for transferring water from said second reservoir to said first reservoir, controllably filling it, and controllably regulating the height of said buoyant building therein, relative to the ground surface.

6. In the living apparatus of claim 1, a second conduit interconnecting said reservoirs, and a power-operated pump connected to said second conduit for transferring water from said second reservoir to said first reservoir, controllably filling it, and controllably regulating the height of said buoyant building therein, relative to the ground surface.

7. In the living apparatus of claim 1, said hull being of parabolic shape.

8. In the living apparatus of claim 1, said roof being circular and of convex form.

9. In the living apparatus of claim 8, said roof being of parabolic shape.

10. In the living apparatus of claim 8, said roof comprising a body of steel reinforced polyurethane;

and a skin of aluminum covering inner and outer surfaces thereof, for providing efficient insulation against heat transfer therethrough.

11. In the living apparatus of claim 1, said building having a central vertical axis, an energy core upon said hull aligned with said axis;

and an apertured support column upon and communicating with said energy core on said axis and at its upper end supporting said roof.

12. In the living apparatus of claim 11, the support for said roof including a series of spaced angularly related upright trusses underlying said roof with their common inner edges mounted upon said column and with their outer edge overlying and secured to said building wall.

13. In the living apparatus of claim 11, a solar heater centrally mounted on said roof, and conducting means within said column interconnecting said solar heater and energy core.

14. In the living apparatus of claim 13, said solar heater including a pair of angularly related heating sections, each section having an elongated heat and light reflective concave wall of parabolic shape, and generally facing the sun's path; and elongated heat collectors centrally spaced from said reflectors respectively, said conducting means being connected to said collectors.

15. In the living apparatus of claim 14, said energy core including heat storage means;

said heat storage means including a continuous tubular heat exchange coil adapted to receive heated heat exchanger substances from said collectors.

16. In the living apparatus of claim 11, a windmill centrally mounted upon said roof for rotation upon said axis and having a driven shaft extending into said column;

and an electric generator within said column and connected to said shaft.

17. In the living apparatus of claim 13, a windmill centrally mounted upon said roof for rotation upon said axis and including a driven shaft extending into said column;

and an electric generator within said column and connected to said shaft.

18. In the living apparatus of claim 11, said column having a longitudinal bore;

a fireplace including a combustion chamber communicating with said column bore adapted for burning combustible wastes and logs;

and at least one heat exchanger within said column bore above said combustion chamber over which the products of combustion pass upwardly through said bore and conduit means connecting said heat exchanger to said energy core.

19. In the living apparatus of claim 11, an incinerator within said energy core having a combustion chamber and a burner adapted to selectively receive liquid and gaseous fuels or combustible garbage;

an exhaust stack between said combustion chamber and the interior of said column;

and a heat exchanger coil within said stack and connected to said energy core for the storage of heat from said combustion chamber.

20. In the living apparatus of claim 19, an isolated liquid fuel storage chamber within said hull spaced from said energy core;

a liquid fuel tank within said storage chamber;

a conduit interconnecting said tank and the burner in said incinerator;

and a metering valve in said conduit for initiating and regulating the flow of fuel to said incinerator.

21. In the living apparatus of claim 19, an isolated gaseous fuel storage chamber within said hull spaced from said energy core;

a methane tank within said storage chamber;

a conduit interconnecting said tank and said incinerator;

and a metering valve in said conduit for initiating and regulating the flow of methane to said burner.

22. In the living apparatus of claim 21, a methane generator within said hull adapted to use organic waste material from in and outside of the building;

and a conduit interconnecting said generator and said methane tank.

23. In the living apparatus of claim 19, said energy core including a coiled heat exchanger.

24. In the living apparatus of claim 22, said methane generator including a closed tank holding a slurry;
inlet conduits adapted for delivering organic and other wastes from the building interior into said tank;
an inlet conduit extending to the outside of the building for feeding plant wastes and manure into said tank;
a power agitator within the slurry in said tank;
a methane gas outlet within said tank above said slurry;
a collector for said methane connected to said conduit;
and a further conduit interconnecting said collector and methane storage tank.

25. In the living apparatus of claim 11, said building having a stove, a refrigerator and a freezer;
a conduit communicating with the heat exchanger coils of said refrigerator and freezer and with the exhaust from said stove;
a heat exchanger within said conduit;
and a further conduit interconnecting said heat exchanger and energy core.

* * * * *